United States Patent [19]

Yen et al.

[11] Patent Number: 4,672,641
[45] Date of Patent: Jun. 9, 1987

[54] SURFACE ACOUSTIC WAVE DEVICE FOR DATA RATE REDUCTION

[75] Inventors: Kuo-Hsiung Yen, Manhattan Beach; Robert B. Stokes, Torrance; Marshall Y. Huang, Rancho Palos Verdes, all of Calif.

[73] Assignee: TRW Inc., Redondo Beach, Calif.

[21] Appl. No.: 615,609

[22] Filed: May 31, 1984

[51] Int. Cl.$^4$ ............................ G01L 3/02; H04B 1/66
[52] U.S. Cl. .................................... 375/122; 364/827; 381/34
[58] Field of Search ..................... 358/140; 375/122; 370/109; 381/34, 35; 364/726, 827; 343/5 FT, 17.2 PC; 333/193; 310/313 B

[56] References Cited

U.S. PATENT DOCUMENTS

| | | | |
|---|---|---|---|
| 3,202,764 | 8/1965 | Adams et al. | 370/109 |
| 3,639,695 | 2/1972 | Bertheas | 343/17.2 PC |
| 3,825,860 | 7/1974 | Carr | 310/313 B |
| 4,025,954 | 5/1977 | Bert | 310/313 B |
| 4,071,906 | 1/1978 | Buss | 364/827 |
| 4,356,353 | 10/1982 | Eng et al. | 381/34 |
| 4,524,363 | 6/1985 | Kretschmer | 364/726 |

OTHER PUBLICATIONS

Jack—"Fourier Transformation Processors"—Wave Electronics No. 3, Nov. pp. 229-247.

Primary Examiner—Joseph A. Orsino, Jr.
Attorney, Agent, or Firm—Noel F. Heal

[57] ABSTRACT

A surface acoustic wave (SAW) device, and corresponding method, for expanding or contracting the time scale of an input signal that varies in time but is limited to a predetermined time interval. One embodiment of the invention achieves time expansion or compression by means of two Fourier transformations providing different chirp rates, and implemented in a form that includes only five SAW dispersive delay lines. In the illustrative version of this embodiment, three of the dispersive delay lines are used in conjunction with multipliers or mixers, and two are used as convolvers. Another embodiment of the invention uses only three SAW dispersive delay lines, two in conjunction with multipliers and one located between the multipliers to effect the desired time-scale change. A third embodiment of the invention employs a SAW tapped delay line and an associated set of gates to select successive data bit signals from successive output taps in the delay line. A SAW fill-in filter is used to fill in inter-bit gaps resulting from the use of the tapped delay line.

6 Claims, 25 Drawing Figures

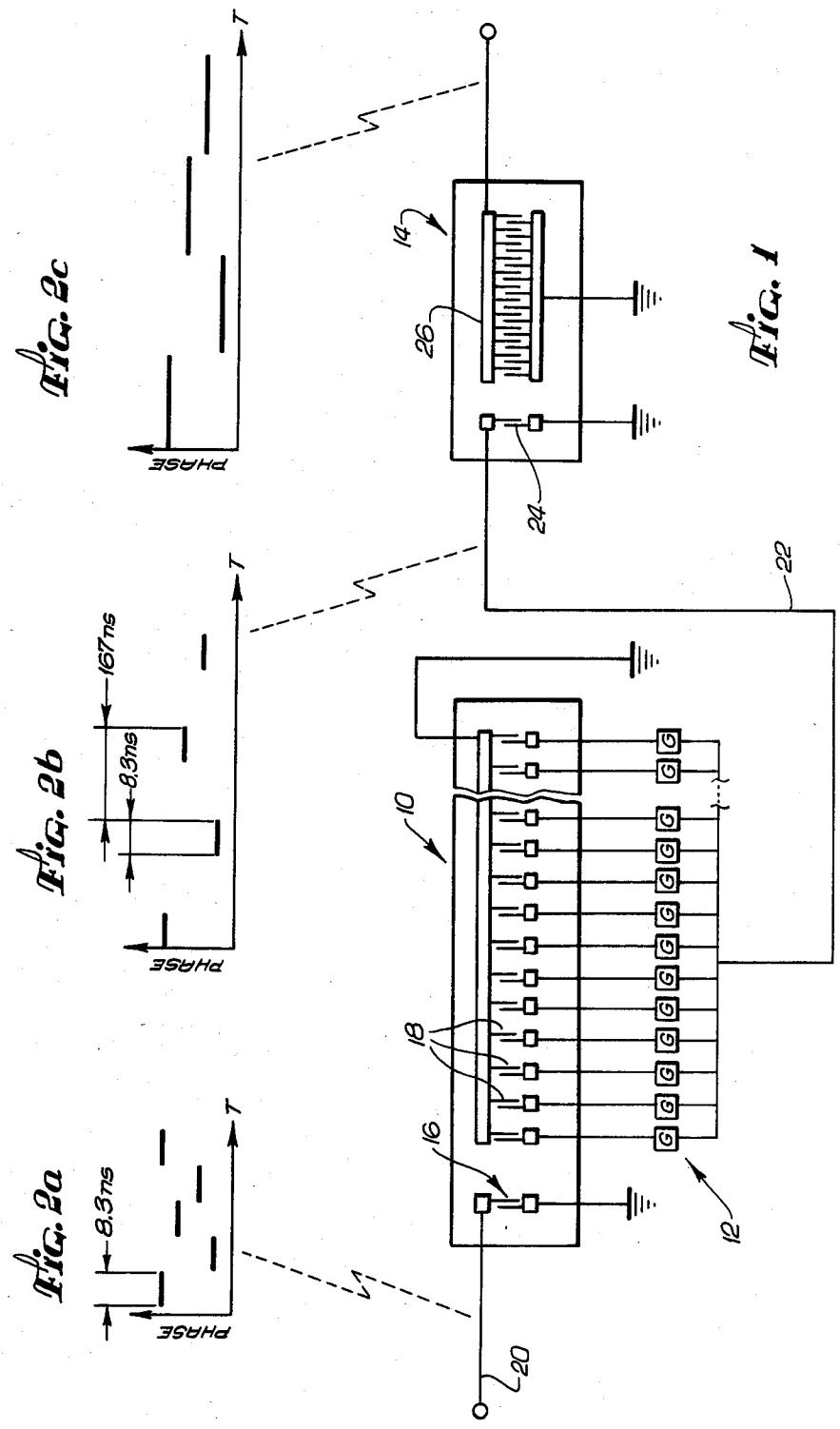

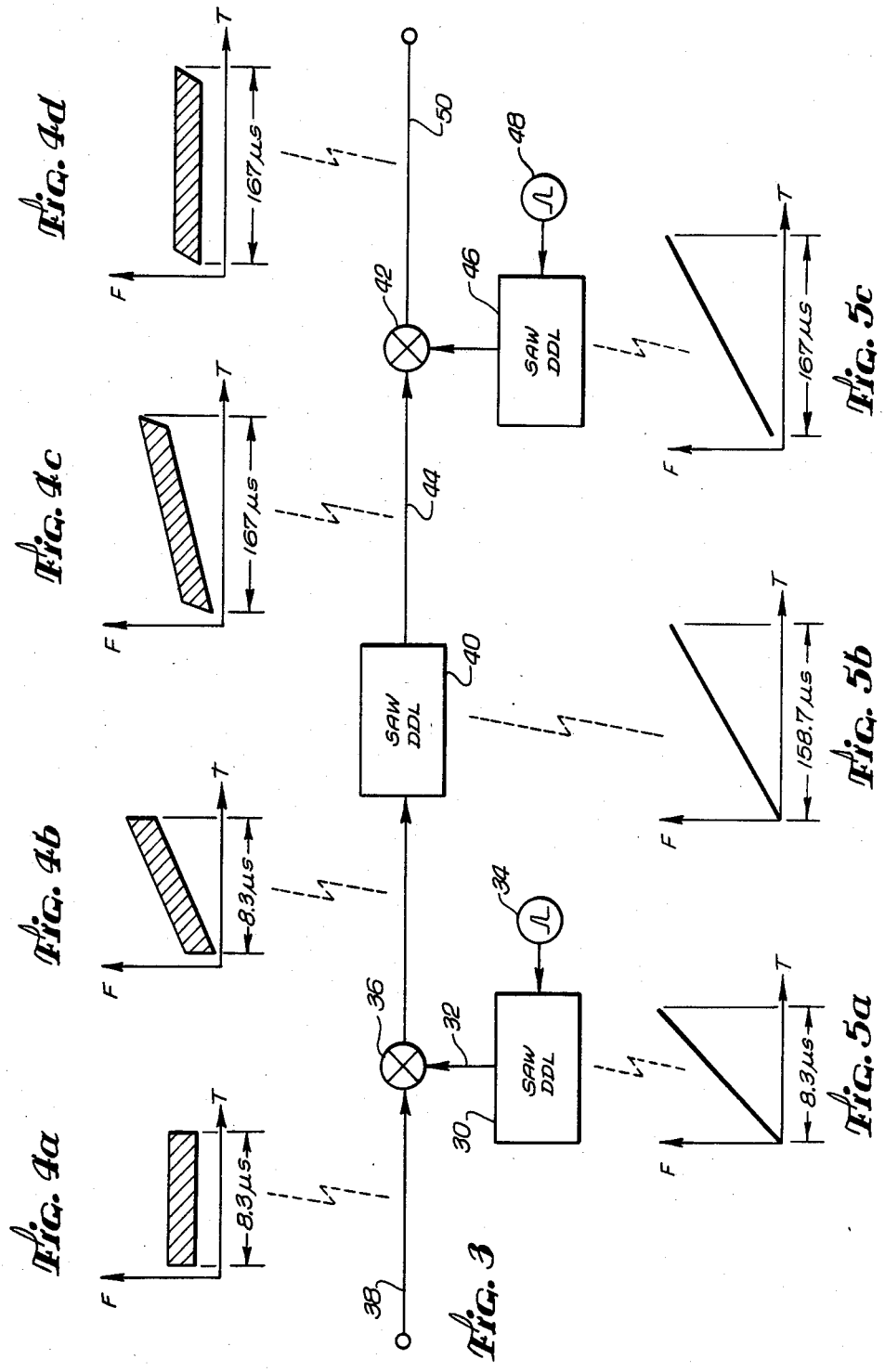

SURFACE ACOUSTIC WAVE DEVICE FOR DATA RATE REDUCTION

BACKGROUND OF THE INVENTION

This invention relates to devices for slowing the rate of a stream of data. Some communication systems transmit data in extremely rapid bursts, either for security reasons or for purposes of time-compression multiplexing. A receiver of the time-compressed data stream may not be able to process it at the high transmission rate. Although electronic equipment could be designed to process received data at high speeds, such equipment is complex and expensive. Accordingly, the cost of receiver equipment for receiving high-speed transmissions would be considerably reduced if the incoming data rate could be reduced by a factor of ten to twenty.

Digital data are typically transmitted by modulating a high-frequency carrier signal. One widely used modulation technique is quadrature phase-shift keying (QPSK), in which digital data are coded as selected phase shifts in the carrier signal. The carrier may assume any of four quadrature relative phases, and is subject to a phase shift for each bit of data transmitted. In one typical application, the signal transmission rate within a burst may be in the order of 120 Mbps (megabits per second), and each burst may include around 1,000 bits, in an interval of about 8-10 microseconds. Any data rate expansion technique must preserve the phase of the original signal for subsequent demodulation.

Surface acoustic wave devices have been proposed for use in time-expanding or time-compressing applications. For example, U.S. Pat. No. 4,356,353 issued in the names of Eng et al. discloses time "companding" apparatus for use in a time-compression multiplexing system. The basic technique disclosed by Eng et al. is to process a signal with a Fourier transform circuit, a multiplication circuit, and an inverse Fourier transform circuit. As is well known, Fourier transformation of a time-varying signal is equivalent to transformation from the time domain to the frequency domain. The Fourier transform circuits in the Eng et al. patent are implemented as surface acoustic wave (SAW) devices in the form of linear dispersive filters. By appropriate selection of the filter parameters, the apparatus performs a desired degree of time expansion or compression.

The Eng et al. technique requires the use of two convolver circuits and five multiplier circuits. The convolvers and four of the multipliers, or mixers, all employ SAW devices in the form of chirp filters. One embodiment of the present invention is directed to an improved technique of the same general type as that disclosed by Eng et al. Other embodiments of the invention achieve time expansion by somewhat different but related approaches.

SUMMARY OF THE INVENTION

The present invention resides in apparatus, and a related method, for expanding the time scale of a time-varying burst of signals with a minimum number of circuit elements. One embodiment of the invention performs a Fourier transform and an inverse Fourier transform, to effect time expansion of a signal, and employs only three mixing circuits and a total of only five SAW chirp filters. Another embodiment of the invention that is more than adequate for time expansion in many applications, uses only two mixers and three SAW chirp filters. A third embodiment of the invention utilizes a SAW tapped delay line and a SAW fill-in filter to perform synchronous time expansion of an input signal.

Basically, the five-chirp time expander of the invention comprises two Fourier transform modules, each of which includes either a multiplier, a convolver, and a second multiplier, in that order (referred to for convenience as MCM), or a convolver, a multiplier, and a second convolver, in that order (CMC). The two Fourier transform modules are connected in cascade, and the two adjacent circuit elements, e.g. two multipliers, are combined into a single element of the same type. Thus the composite device comprises a multiplier-convolver-multiplier-convolver-multiplier (MCMCM) combination, or alternatively a convolver-multiplier-convolver-multiplier-convolver combination (CMCMC).

In terms of a novel method, this embodiment of the invention comprises the steps of performing two successive Fourier transformations on an input signal, each transformation including in one disclosed embodiment using the MCMCM combination, mixing the input signal with a chirp signal, passing the resulting signal through a SAW dispersive delay line, then mixing the output of the delay line with another chirp signal. Importantly, the last mixing step of the first transformation and the first mixing step of the second transformation are combined into a single mixing step, and the parameters of the chirp signals and of the delay lines are selected to effect a desired change in time scale.

The three-chirp configuration of the invention includes a first multiplier or mixer, a first SAW dispersive delay line, and a second multiplier. The first multiplier functions to mix the incoming signal with a linear frequency-modulated chirp signal, which can be produced by impulsing a second SAW dispersive delay line. The sum frequency at the first mixer output contains the original data distributed over frequency as well as time. The first-mentioned dispersive delay line imposes a delay time that varies with frequency. Finally, the second multiplier mixes the signal from the first-mentioned dispersive dealy line with the impulse response from a third dispersive delay line, to remove the chirp carrier from the dispersed signal. The end result is a time-expanded data signal on a continuous-wave (CW) carrier, which can be processed inexpensively by relatively slow electronic circuits.

In terms of a method, this embodiment of the invention comprises the steps of mixing an input signal with a linear frequency-modulated chirp signal to distribute the signal over frequency as well as time, applying the mixed signal to at least one SAW dispersive delay line to obtain an intermediate signal whose distribution over time in a manner that varies with frequency, and mixing the intermediate signal with another chirp signal to produce an output signal in which the frequency distribution is reduced to that of the input signal, leaving a desired modified time distribution.

The remaining embodiment of the invention employs a SAW tapped delay line, a set of control gates, and a SAW fill-in filter. The SAW tapped delay line has an input transducer and a number of successively spaced output transducers. The spacing of the output transducers is a desired multiple of the spacing between successive bits of the input signal, and the gates are controlled to to select a first data bit through the first gate, a second data bit through the second gate, and so forth. The composite output from the gates is a stream of data signals that are stretched out in time, but are each of relatively short duration, leaving relatively large inter-bit signal gaps. The function of the fill-in filter is to increase the duration of each signal, to provide an output data signal that is expanded in time, as desired. The fill-in filter has a relatively short input transducer, but an output transducer that is relatively long in the direction of propagation, such that each input bit produces a long output bit, and the blank spaces between data bits are effectively filled in.

In terms of a method, this embodiment of the invention comprises the steps of inputting an input signal burst to a SAW tapped delay line, and selectively activating a plurality of gates connected to respective output taps of the delay line, to produce an intermediate sequence of signals corresponding to the input signal burst but being spaced further apart in time. The method also includes applying the intermediate sequence of signals to a SAW fill-in filter having a relatively short input transducer and a relatively long output transducer, and producing an output signal from the fill-in filter, with gaps between the signals in the intermediate sequence of signals filled in.

It will be appreciated from the foregoing that the present invention represents a significant advance in the field of time-expanding or time compacting signal processors. In particular, the invention provides an improved technique for time expansion and compaction using SAW dispersive delay lines, and, in one embodiment, a simple SAW tapped delay line. Other aspects and advantages of the invention will become apparent from the following more detailed description, taken in conjunction with the accompanying drawings.

BRIEF DESCRIPTION OF THE DRAWINGS

FIG. 1 is a schematic view of a time-expanding signal processor in accordance with a first embodiment of the invention;

FIGS. 2a-2c are phase-time graphs showing a data signal at various stages in the signal processor of FIG. 1;

FIG. 3 is a schematic view of a time expanding signal processor in accordance with a second embodiment of the invention;

FIGS. 4a-4d are frequency-time graphs indicative of a data signal at various stages in the signal processor of FIG. 3;

FIGS. 5a-5c are frequency-time graphs illustrating the impulse response of each of three SAW dispersive delay lines used in the signal processor of FIG. 3;

FIG. 6 is a schematic view of a time-expanding signal processing circuit in accordance with a third embodiment of the invention;

FIGS. 7a-7g are frequency-time graphs indicative of a data signal at various stages of the signal processor of FIG. 6;

FIGS. 8a-8d are frequency-time graphs illustrating the impulse response of each of four SAW dispersive delay lines used in the signal processor of FIG. 6.

DESCRIPTION OF THE PREFERRED EMBODIMENTS

Figure 9:
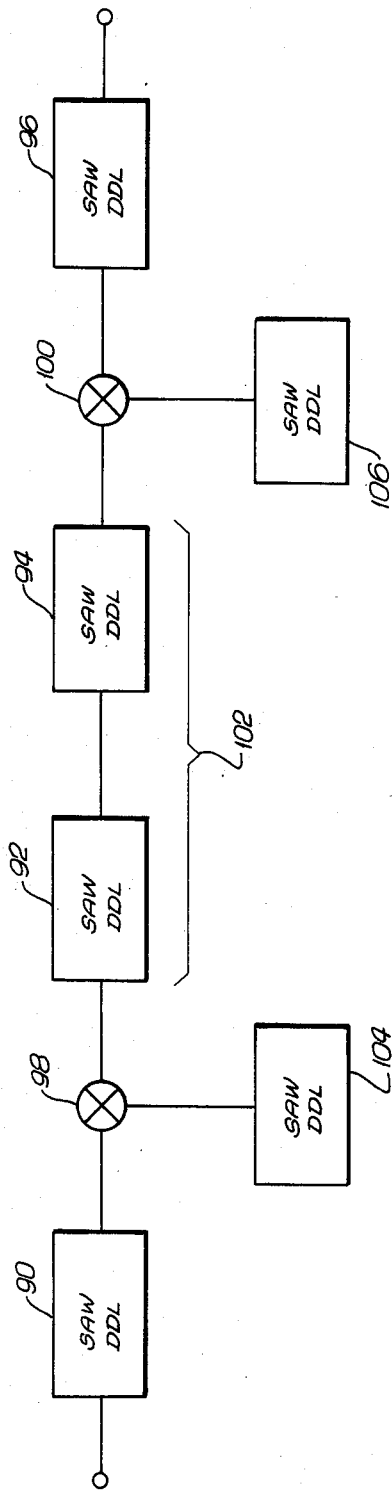
FIG. 9 shows a fourth embodiment of the invention.

As shown in the drawings for purposes of illustration, the present invention is concerned with improvements in the field of surface acoustic wave (SAW) devices employed for time expansion or time compression. An important application for such devices is in time expansion of received signals that were transmitted at a very high data rate, either for reasons of signal security, or in implementing a time-compression multiplexing scheme. Prior attempts to provide time expansion or compression using SAW devices have been relatively complex and costly.

In accordance with the present invention, a time expansion/compression device is provided using a minimal number of SAW devices and without sacrificing performance. Four basic embodiments of the invention are illustrated and described in the reverse of the order in which they were summarized in the Summary of the Invention, above.

One embodiment of the invention is shown in FIG. 1 as including a SAW tapped delay line, indicated generally by references numeral 10, a set of controlled gates 12, and a SAW fill-in filter 14. The tapped delay line 10 includes an input transducer 16 and a plurality of spaced output transducers 18. An input signal is received on an input line 20 and applied to the input transducer 16. By way of example, the input signal may be a 400 megahertz (MHz) carrier signal modulated by quadrature phaseshift keying (QPSK) at 120 megabits per second (MBPS). The input signal is received in short bursts of, for example, 1,000 bits each.

As indicated in FIG. 2a, the input signal has a possible phase change every 8.33 ns (nanoseconds). The object of the time-expansion device is to produce a signal with twenty times this bit spacing, i.e. 167 ns. The spacing of the tapped delay line 10 is such as to provide a time expansion factor of twenty. In other words, the output transducers 18 are spaced by a multiple of the distance between two successive bits propagated across the SAW delay line 10.

The gates 12 are separately controlled by a signal synchronized with the incoming data rate, to select the first gate twhen the first data bit is passing under the first output transducer, the second gate when the second data bit is passing under the second transducer, and so forth. The outputs from the gates 12 are connected in common to a single output line 22, which is in turn connected as an input to the SAW fill-in filter 14. The resultant output signal, as shown in FIG. 2b, has been expanded in time. However, each data bit still has its original short duration and there is a long bit-spacing interval between adjacent bits of the signal. Since the incoming data burst does not span all of the output transducers at once, each of the gates 12 can handle more than one output bit. For example a burst of 1,000 bits may span only about fifty-one output transducers. Therefore, the gate associated with the first output transducer can also be associated with the fifty-first transducer, and so forth. In this manner, the number of gates can be minimized if desired.

The San fill-in filter 14 has a single input transducer 24 of relatively short length, and an output transducer 26 of relatively long length, as measured in the direction of acoustic propagation in the device. The length of the output transducer 26 is equivalent to the desired filled-in length of the data pulses. In the example given, the output transducer 26 has a length corresponding to nineteen times the original data pulse length, since that is the length of the inter-bit gap in FIG. 2b. The resultant time-expanded data signal is shown in FIG. 2c, in which the original 1,000-bit burst has been slowed from 120 MBPS to only 6 MBPS.

Although the technique described with reference to FIGS. 1 and 2 is adequate for many purposes, its principal disadvantage is that it requires a timing signal synchronized with the incoming data rate. Another limitation is that, in order to preserve the phase values of each data bit, the spacing between taps of the SAW delay line 10 must be a multiple of the acoustic wavelength of the original carrier signal. Variations in the carrier frequency can cause a departure from this relationship resulting in data errors.

Another embodiment of the invention makes use of a linear, frequency-modulated chirp signal, i.e. a signal whose frequency varies linearly with time. It is well known that such a chirp signal can be generated by applying an impulse signal to a SAW dispersive delay line. As shown in FIG. 3, a first SAW dispersive delay line 30 provides a chirp signal on output line 32 in response to an impulse signal, indicated at 34. The chirp signal on line 32 is mixed in a multiplier 36 with a burst of data input signals on line 38. FIG. 4a shows the input signal burssst in the form of a frequency-time graph. The shaded area in FIG. 4a indicates that the input signal burst extends over a relatively narrow band of frequencies and over a time span of 8.3 microseconds, consistent with the previously used example of 1,000 bits at 120 MBPS. The impulse response of the first SAW dispersive delay line 30 is shown in FIG. 5a as a signal that increases in frequency linearly with time over the time span of the signal burst.

The multiplier 36 produces signal components having both sum and difference frequencies of the signals input to the multiplier, but only the frequency-sum components are considered, other components being filtered out as in conventional mixers. The frequency-sum components result in a signal of the form shown in FIG. 4b. The signal components occurring later in time during the burst are affected by the linearly increasing chirp frequencies with which they are mixed, and the result is a frequency-time plot that slopes upwardly in a linear manner. Accordingly, FIG. 4b shows a parallelogram with two sides sloping with respect to the time axis and two sides parallel with the frequency axis.

The output of the multiplier 36 is applied as an input to a second SAW dispersive delay line 40. The parameters of this delay line are selected to provide a dispersive delay of 158.7 microseconds.

One type of SAW dispersive delay line achieves dispersion by reflecting surface acoustic waves in a generally U-shaped path using two arrays of reflectors with chirped spacings. Such devices are sometimes referred to as reflective array compressors, or RAC's. They provide a time delay from input to output that varies linearly with frequency, either positively or negatively, i.e. either the higher frequencies are delayed more than the lower frequencies, or vice versa.

In the three-chirp device of FIG. 3, the second dispersive delay line 40 provides an output that is still spread over the same frequency range as the input, as will be seen by comparing the output signal (FIG. 4c) with the input signal (FIG. 4b). However, the output signal is now further dispersed along the time axis, by a factor of twenty.

The final step in the process is to remove the frequency slope in the signal, by processing in a second multiplier 42, to which the output of the second dispersive delay line 40 is transmitted, over line 44. The other input to the multiplier 42 is provided by another SAW dispersive delay line 46, the output of which is obtained by applying an impulse signal, as indicated at 48. The impulse response of this device is shown in FIG. 5c, and is selected to reverse the effect of the chirp signal that was mixed with the input signal in the first multiplier 36.

The resulting output signal, on line 50, has the form shown in FIG. 4d, i.e. it has the same bandwidth as the input signal but the time scale has been expanded by a factor of twenty. As will be appreciated from non-sloping frequency-time characteristic of FIG. 4d, the output on line 50 from multiplier 42 retains only the difference frequencies resulting from the multiplication.

A disadvantage of the system described with reference to FIG. 3 is that the output still contains a slight time distortion that is dependent on frequency, as indicated by the sloping ends of the shaded area in FIG. 4d, which is no longer a perfect rectangle. Accordingly, the technique illustrated in FIG. 3 is best suited for input signals of relatively narrow bandwidth. Another possible drawback is that the dispersive delay lines 40 and 46 must have relatively long dispersive delays, and bandwidths greater than that of the original input signal. The last embodiment to be described does not suffer from these disadvantages.

FIG. 6 shows in schematic form an embodiment of the invention employing two Fourier transformations of the input data burst. As illustrated, this form of the invention includes four multipliers 60, 62, 64 and 66, four corresponding SAW dispersive delay lines 68, 70, 72 and 74, rrespectively, and two additional SAW dispersive delay lines 76 and 78 used as convolvers. Convolver 76 and multipliers 60 and 62 together perform a first Fourier transformation, and convolver 78 and multipliers 64 and 66 perform a second Fourier transformation. As will shortly be appreciated, however, the two adjacent multipliers 62 and 64 may be combined into a single component.

The principle of operation of this form of the invention may best be appreciated by consideration of the frequency-time diagrams of FIGS. 7a-7g. FIG. 7a shows an illustrative frequency-time distribution for an input signal burst. For convenience of illustration, the distribution is divided into a three-by-two lattice of rectangles, there being initially three rectangles in the direction of the time axis and two in the direction of the frequency axis. For further ease of reference, an X is placed in the upper-left rectangle as viewed in FIG. 7a.

In the first multiplier 60, the input signal is mixed with a linear chirp signal generated by dispersive delay line 68. The chirp signal is generated in response to the application of an impulse signal to the delay line 68, as indicated at 80. The frequency-sum output of the multiplier 60 has the form shown in FIG. 7b. Basically, the frequency-time distribution of the signal burst has been skewed to a slope determined by the chirp slope of the signal from the dispersive delay line 68.

The output of the first multiplier 60 is applied as an input to convolver 76, which is selected to delay low frequencies more than high frequencies, and to provide an output of the form shown in FIG. 7c. The parallelogram that constitutes the distribution shown in FIG. 7b has been further skewed in a counterclockwise direction, and the X reference mark is now in the lower-left rectangle of the distribution.

The signal output from the convolver 76 is next applied as an input to the second multiplier 62, which has as its second input a chirp signal from dispersive delay line 70, as a result of an impulse applied at 82. This chirp signal is selected to have the same characteristics as the one applied to the first multiplier 60. The effect of the second multiplier 62 is to modulate the signal of FIG. 7c with the chirp signal, and to effectively skew the frequency-time distribution back into a rectangular form, as shown in FIG. 7d. It will be noted in comparing FIGS. 7a and 7d that the two multiplying steps and one convolving step have turned the frequency-time distribution through ninety degrrees, effectively transposing the time and frequency axes. This, of course, is the essence of Fourier transformation.

The remaining multipliers 64 and 66 and the convolver 78 also perform a Fourier transformation, but with different parameters. Multiplier 64 mixes the output from multiplier 62 with a chirp signal from dispersive delay line 72, in response to an impulse signal 84. Delay line 72 provides a negatively ssloped impulse response. FIGS. 8a and 8b show the impulse responses of delay lines 68 and 70, and FIG. 8c shows the impulse response of delay line 72. As a result of the negatively sloped chirp signal, the frequency-time distribution is skewed clockwise by the multiplier 64, as indicated in FIG. 7e. This signal is next applied to the second convolver 78, which is selected to provide a longer dispersive delay than the first convolver 76, but over a smaller bandwidth. Convolver 78 is of the type that delays higher frequencies more than lower ones. The result is that the frequency-time distribution is again skewed in a clockwise direction, is stretched substantially in the time-axis direction, and is compacted in the frequency-axis direction.

As shown in FIG. 7f, the output of the second convolver 78 is elongated in the time direction but still has a positive slope. The final multiplication step, in multiplier 66, removes this positive slope by mixing the processed signal with another negative-sloped chirp signal, obtained from dispersive delay line 74 as a result of an impulse signal 86. The impulse response of delay line 74 is shown in FIG. 8d and the final output signal frequency-time distribution is shown in FIG. 7g. It will be observed that this has identical orientation to the original frequency-time distribution of FIG. 7a, but that the time axis has been expanded.

An important consideration is that the two adjacent multipliers 62 and 64 may be combined to form a single multiplier, as indicated by the bracket 90 in FIG. 6. Both delay lines 70 and 72 associated with the multipliers 62 and 64 have ientical dispersion delays and differ only in the slopes of the chirp signals they generate in response to impulse signals. Both of the multipliers effect skewing of the frequency-time distribution. The same total skew of the distribution may be effected by a single multiplier with a composite chirp slope.

For a given input signal bhurst and a desired time expansion factor, there are clearly a number of different solutions using the same configuration of FIG. 6. One possible solution is indicated in the figure, in which each dispersive delay line has shown a dispersive delay time and a bandwidtth. A negative bandwidth indicates a negative chirp slope. In general terms, the respective bandwidths and dispersive delays of the convolvers 76 and 78, and the respective bandwidths and dispersive delays of the dispersive delay lines which supply chirp signals to the multipliers 60, 90 and 66, are given by the following table, in which:

|  | Bandwidth | Disp. Del. |
| --- | --- | --- |
| 1st multiplier | b | T |
| 1st convolver | B + b | (1 + B/b)T |
| 2nd multiplier 3rd multiplier combined | B(1 − 1/N) | BT/b |
| 2nd convolver | b + B/N | (B/b + N)T |

-continued

|  | Bandwidth | Disp. Del. |
| --- | --- | --- |
| 4th multiplier | b | NT | b = the bandwidth of the first multiplier,
B = the input signal bandwidth,
T = the input frame length, and
N = the time expansion ratio.

Typically, the values of B, T and N are design parameters that are known, and selection of the parameter b, the bandwidth of the first multiplier, will determine all of the remaining parameters. It will be seen that, in FIG. 6, the values used are B=200 MHz, T=8 microsec., N=10, and b=200 MHz. Various other parameter choices may be made to minimize cost. The cost of dispersive delay lines is roughly dependent on the product of the dispersive delay time and bandwidth. To minimize cost, a desired time expanssion ratio can be achieved by using a combination of two or more systems of the configuration of FIG. 6. Alternatively, a given input frame size can be processed in time segments by separate systems of the FIG. 6 type.

Still another consideration is that there is presently an upper limit of about 90 microseconds for the dispersive delay in a reflective array compactor (RAC). Accordingly, some design choices must be ruled out on this basis.

With these options and considerations in mind, another illustrative configuration is given by the following table. The input bandwidth is 200 MHz and the input frame size is 2.78 microseconds for each of three systems. The time expansion ratio is 20.

|  | BW(MHz) | DD(microsec) |
| --- | --- | --- |
| 1st Mult. | 43.6 | 2.78 |
| 1st Conv. | 243.6 | 15.51 |
| 2nd & 3rd Mult. | 190.0 | 12.73 |
| 2nd Conv. | 53.6 | 68.29 |
| 4th Mult. | 43.6 | 55.56 |

The output frame from each of the three systems is 10 MHz by 55.56 microseconds.

Another design consideration results from a principle of duality with respect to multipliers and convolvers. It follows from this principle that one may achieve an identical result by exchanging multipliers and convolvers in the FIG. 6 configuration. Instead of the MCMCM configuration of FIG. 6, another possibility is an equivalent CMCMC configuration. This follows since a Fourier transformation may be effected equally well by a CMC configuration as by an MCM configuration. Thus, two Fourier transformations may be effected by a configuration CMCCMC, and the two adjacent convolvers may be combined into a single component in same manner as the two adjacent multipliers in FIG. 6.

FIG. 9 shows a CMCCMC configuration wherein elements 90, 92 94 and 96 are SAW devices. SAW devices 92 and 94 may be combined to form a single component 102. Multiplier 98 is placed between SAW devices 90 and 92 and multiplier 100 is placed between SAW devices 94 and 96. SAW devices 104 and 106 are connected to multipliers 98 and 100 respectively.

It will be appreciated from the foregoing that the present invention represents a significant advance in the field of time expansion and compression SAW devices. In particular, the invention provides three possible variations of SAW time expanders and compressors, one using a SAW tapped delay line, one using three reflective array compactors (RAC's), and one using five RAC's. It will also be appreciated that, although specific embodiments of the invention have been described for purposes of illustration, various modifications may be made without departing from the spirit and scope of the invention. Accordingly, the invention is not to be limited except as by the appended claims.

We claim:

1. A system for expanding the time scale of a time-varying but time-limited signal, comprising:
   a first Fourier transformation device having a first multiplier for receiving input signals, a second multiplier for generating output signals, two associated SAW dispersive delay lines and one intermediate SAW dispersive delay line connected in series between the first and second multipliers, the SAW dispersive delay lines associated with the multipliers being connected each to one input of its associated multiplier, to provide chirp signals to the multipliers; and
   a second Fourier transformation device in series with and structured identically to the first;
   wherein the first and second Fourier transformation devices have different associated chirp slopes, to effect a change in the time scale of an input signal applied to the system;
   and wherein the second multiplier of the first Fourier transform device and the first multiplier of the second Fourier transform device are combined into a single component.

2. A method for expanding or contracting the time scale of a time varying but time-limited digital input signal, comprising the steps of:
   performing two successive Fourier transformations on the input signal, each transformation including the steps of first mixing the input signal with a chirp signal, then passing the resulting signal through a SAW dispersive delay line, then mixing the output of the delay line with another chirp signal;
   wherein the last mixing step of the first transformation and the first mixing step of the second transformation are combined into a single mixing step, and wherein the parameters of the chirp signals and of the delay lines are selected to effect a desired change in time scale.

3. A system for expanding the time scale of a time-varying but time-limited signal, comprising:
   a first Fourier transformation device having two SAW dispersive delay lines an intermediate multiplier and associated SAW dispersive delay line, the multiplier being connected in series between the two SAW dispersive delay lines, the SAW dispersive delay line associated with the multiplier being connected to one input of the multiplier to provide a chirp signal to the multiplier; and
   a second Fourier transformation device connected in series with and structured identically to the first;
   wherein the first and second Fourier transformation devices have different associated chirp slopes, to effect a change in the time scale of an input signal applied to the system;
   and wherein the two adjacent SAW dispersive delay lines of the two series-connected Fourier transformation devices are combined into a single component.

4. A system for expanding the time scale of a time-varying but time-limited signal, comprising:
   first and second multipliers, each for mixing a signal burst applied to one input with a linear frequency modulated chirp signal applied to the other input;
   first and second surface acoustic wave (SAW) dispersive delay lines selected to provide a desired linear frequency modulated chirp signal, for input to a corresponding multiplier, in response to an input impulse signal; and
   one additional SAW dispersive delay line located between the first and second multipliers;
   and wherein
   the multipliers and the additional SAW dispersive delay line are connected in a series string in such a manner as to effect time expansion of an input signal burst applied to one end of the series string and having a rectangular frequency-time distribution extending over a constant narrow frequency band for a short period of time,
   each multiplier modifies the frequency-time distribution of a signal burst by changing its distribution along the frequency axis, and the additional SAW dispersive delay line modifies the frequency-time distribution of a signal burst by changing its distribution along the time axis,
   the first multiplier effects a skewing of the frequency-time distribution of the input signal in response to mixing with a positively sloped chirp signal,
   the dispersive delay line located between the first and second multipliers applies a substantial time delay to signals output from the first multiplier, and still leaves the frequency-time distribution in a skewed orientation with respect to the time axis, and
   the second multiplier mixes another chirp signal with the signal from the delay line between the first and second multipliers, and skews the frequency-time distribution back to an orientation parallel with the time axis, but with the time dimension of the distribution substantially lengthened.

5. A system for expanding the time scale of a time-varying but time-limited signal, comprising:
   a plurality of multipliers, each for mixing a signal burst applied to one input with a linear frequency modulated chirp signal applied to the other input;
   a like plurality of surface acoustic wave (SAW dispersive delay lines selected to provide a desired linear frequency modulated chirp signal, for input to a corresponding multiplier, in response to an input impulse signal; and
   additional SAW dispersive delay line means;
   wherein the total number of SAW dispersive delay lines, including the additional SAW dispersive delay line means, is five, and the multipliers and the additional SAW dispersive delay line means are connected in an alternating sequence in a series string in such a manner as to effect time expansion of an input signal burst applied to one end of the series string and having a rectangular frequency-time distribution extending over a constant narrow frequency band for a short period of time;
   and wherein each multiplier modifies the frequency-time distribution of a signal burst by changing its distribution along the frequency axis, and each additional SAW dispersive delay line means modifies the frequency-time distribution of a signal burst by changing its distribution along the time axis.

6. A system as set forth in claim 5, wherein:

the plurality of multipliers includes only first, second and third multipliers and the additional SAW dispersive delay line means includes only first and second additional SAW dispersive delay lines, the multipliers and the additional SAW dispersive delay lines being connected in alternating sequence beginning with the first multiplier;

the first multiplier effects a skewing of the frequency-time distribution of the input signal by an amount determined by a chirp signal associated with the first multiplier;

the first additional SAW dispersive delay line delays low frequencies more than high frequencies, and skews the frequency-time distribution until lines that were constant-frequency lines in the original distribution becomes lines parallel with the frequency axis;

the second multiplier mixes its input signal with another chirp signal and adjusts the frequency-time distribution, leaving lines parallel with the frequency axis in the same relationship but skewing the distribution until a desired orientation is reached;

the second additional SAW dispersive delay line delays high frequencies more than low ones, and skews the distribution until lines that were previously parallel with the frequency axis are extended substantially along the time axis; and the third multiplier skews the distribution until it is again rectangular, with a pair of sides parallel to each of the axes, but with the dimension along the time axis expanded.

* * * * *